Figure 6:
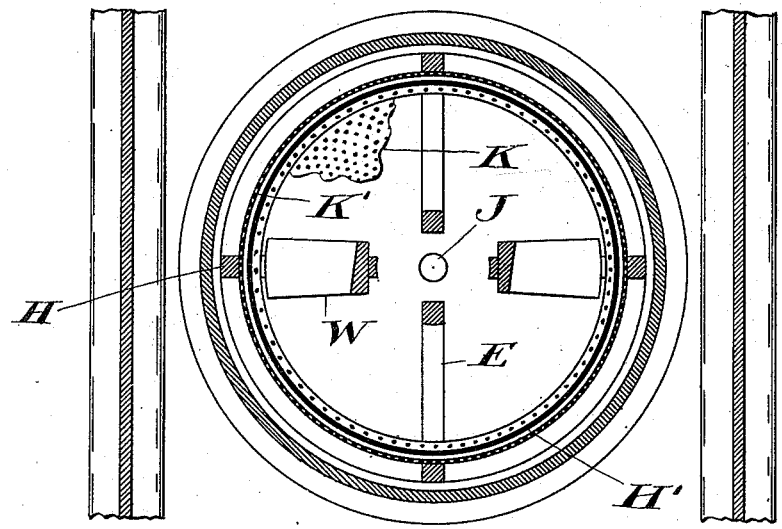

(No Model.)　　　　　H. J. MURNEY.　　　4 Sheets—Sheet 1.
FILTERING DEVICE.
No. 598,383.　　　　　　　　　Patented Feb. 1, 1898.
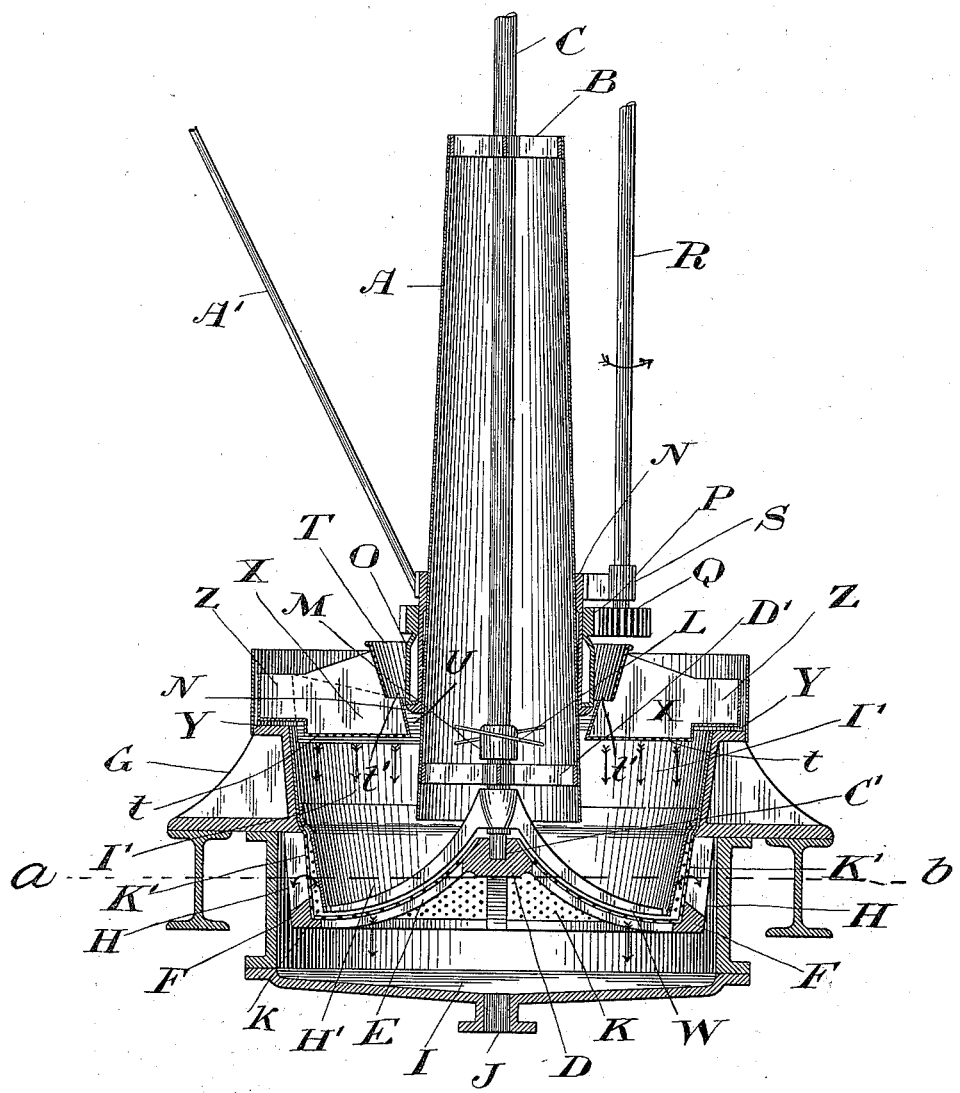

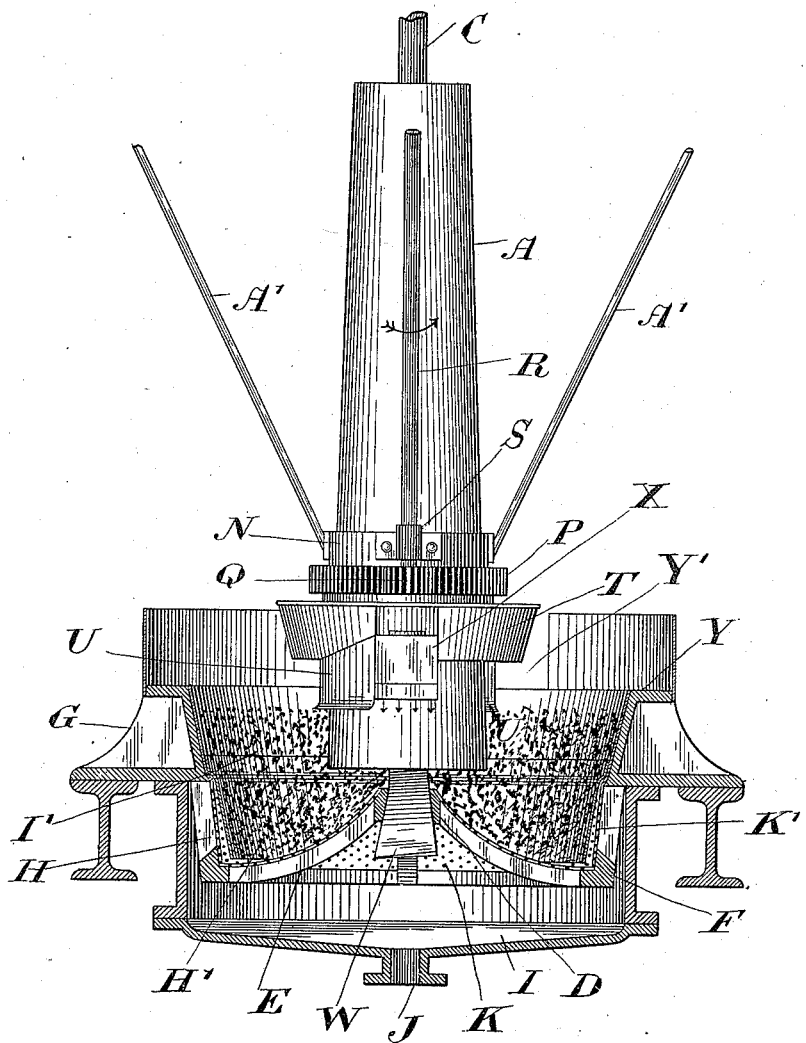

(No Model.) 4 Sheets—Sheet 3.
H. J. MURNEY.
FILTERING DEVICE.
No. 598,383. Patented Feb. 1, 1898.
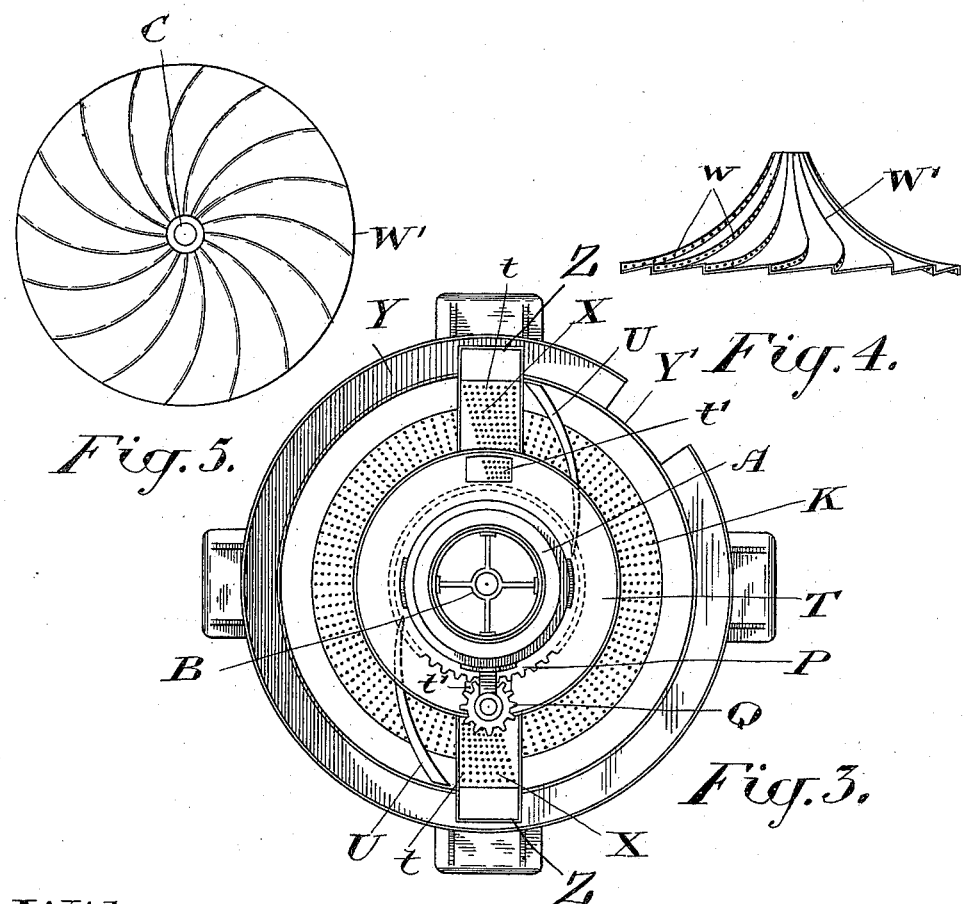
Witnesses
W. J. McMillan
A. M. Neff
Inventor
Henry J. Murney
by Ridout & Maybee
Attys.
THE NORRIS PETERS CO., PHOTO-LITHO., WASHINGTON, D. C.

(No Model.)  H. J. MURNEY.  4 Sheets—Sheet 4.
FILTERING DEVICE.

No. 598,383.  Patented Feb. 1, 1898.

Witnesses  Inventor
W. J. McMillan  H. J. Murney
J. N. Neff  by Ridout & Maybee
 attys

UNITED STATES PATENT OFFICE.

HENRY J. MURNEY, OF GODERICH, CANADA.

FILTERING DEVICE.

SPECIFICATION forming part of Letters Patent No. 598,383, dated February 1, 1898.

Application filed April 12, 1897. Serial No. 631,803. (No model.)

*To all whom it may concern:*

Be it known that I, HENRY JAMES MURNEY, of the town of Goderich, in the county of Huron and Province of Ontario, Canada, have invented a certain new and useful Improvement in Filtering Devices, of which the following is a specification.

The object of the invention is to provide a filtering device for separating solids and liquids or removing impurities therefrom in which a fresh supply of filtering material may continually be fed to the material being filtered, which, after passing through the filtering material, passes by gravity through perforations or a screen in the bottom of the device, while the filtering material is forced out of the device in the manner and by the means hereinafter substantially described.

Figure 1 is a sectional front elevation of the filtering device. Fig. 2 is a side elevation of the same with the lower portion in section. Fig. 3 is a plan view of the device. Fig. 4 is a disk composed of perforated radial plates as an alternative for the wedge-shaped arms which operate in the upper chamber. Fig. 5 is a plan view of the disk referred to in Fig. 4. Fig. 6 is a horizontal section taken through the line $a\ b$ of Fig. 1.

In the drawings like letters of reference indicate corresponding parts in the different figures.

A is a feed-cylinder, which is preferably made of sheet metal and is located in a vertical position, as shown.

A' are braces supporting the feed-cylinder in operative position. The filtering material is to pass, preferably, from a hopper into this vertical feed-cylinder and pass therefrom, as hereinafter indicated.

B is a spider which serves the purpose of strengthening-braces for the feed-cylinder and also to keep the feed-cylinder A concentric with the rotatable main shaft C.

C is the main shaft, suitably journaled. The upper bearing is not shown in the drawings. This shaft may be and is supposed to be driven by power either from above or below the machine.

D' is a spider within the feed-cylinder at or near the lower end thereof. The main shaft C also passes through this spider, which serves the same purpose as the spider B for strengthening-braces for the feed-cylinder and also to keep the feed-cylinder concentric with the main shaft C.

C' is a cylindrical pivot at the lower end of the main shaft C. It is fitted into a socket in the socket-block D, as indicated in the drawings.

E are legs or may be a grooved plate with holes through it, through which the liquid may freely pass. These legs or plate hold the socket-block in position and are attached to the base-ring F, and the base-ring is held in position by the braces H, connecting it with the main frame G.

K is the perforated or strainer base-plate, which rests on the legs E. It is extended upward, so as to form perforated or strainer sides K'. These perforated plates or strainers may be made of any suitable material which will allow the liquid to pass and prevent the granular or filtering material from passing through. If sufficient straining capacity can be secured for the material being worked upon, it may not be necessary to have both the perforated base K and the perforated sides K', but either may be used without the other.

$k$ are the perforations or meshes in the base-plate and in the sides.

I is the bottom chamber, formed below the base-plate K and legs or grooved plate E and surrounding the perforated sides K' and braces H.

H' is a baffle-ring, preferably of sheet metal, the upper edge being secured to the main frame inside the perforated sides K' of the perforated base-plate K. This baffle-ring is designed to prevent the filtering material being forced and rubbed against the perforated sides K' and also to cause the liquid to pass through the whole body of filtering material. The lower edge of this baffle-ring is kept a short distance above the bottom of the upper chamber I', so that the liquid may pass through the space below the lower edge of the baffle-ring H' and up and through the perforated sides K', as indicated by arrows in Fig. 1. The filtered material after passing through the filtering material passes into the bottom chamber I and is discharged therefrom through the orifice J.

I' is the upper chamber, formed by the base-plate K and the perforated sides K' as well as by the frame of the machine. This chamber I' is open at the top and is designed to hold the filtering material while performing its office. It may, however, be covered by removable covers, so as to be easy of access.

L is a screw or worm attached to the boss M on the main shaft C. It is located, as indicated, in the lower part of the feed-cylinder A and is intended to force the filtering material through and out of the feed-cylinder A.

N is a guideway encircling the feed-cylinder A. It is a casting and designed for a track or way for the sleeve-ring O, as indicated.

P is a toothed wheel attached to the upper end of the sleeve-ring O and shown more particularly in Fig. 2. This toothed wheel engages with the toothed pinion Q, which is fixed to the lower end of the vertical shaft R.

S is a bearing-box which holds the shaft R in operative position and is attached to the guideway N.

T is an annular trough attached to the sleeve-ring O and movable therewith.

U U are scrapers, as indicated, (see Figs. 2 and 3,) secured to the sleeve-ring O by supports or braces and movable therewith. These scrapers are designed to remove the filtering material after it has performed its office and deposit it onto the ledge formed by the flange Y.

W are wedge-shaped arms which are secured firmly to the main shaft C and are placed at an incline, as indicated in Fig. 2, and are designed to agitate and move upward the filtering material, so that it may be removed from the filtering device by the scrapers U. To take the place of these wedge-shaped arms W, the device illustrated in Figs. 4 and 5 may be employed, in which a disk W' is formed with, as it were, a series of radial arms connected together as well as to the main shaft C, so as to form a corrugated surface, in which are a series of perforations $w$ at the corrugations through which the liquid may pass. This form of perforated disk W' may at times suffice to take the place of the wedge-shaped arms W as well as of the perforated base-plate K, and when this disk W' is so used it may be further necessary to use radial division-plates in the chamber I to keep the filtering material from rotating with the disk.

X X are two basins with perforated bottoms $t$, attached to the annular trough T and diametrically opposite to each other behind the scrapers U U. The liquid to be filtered after it has been poured into the annular trough T passes through the outlets $t'$ into each of the basins X X, from which it passes, as indicated by arrows, (see Figs. 1 and 2,) through the perforations $t$ in the bottom onto the filtering material.

Z Z are two auxiliary scrapers securely attached to the basins X X. They are designed to remove the filtering material from the ledge formed by the flange Y after it has been deposited there by the scrapers U U and discharge it through a hole Y' in the flange Y and the side. (See Figs. 2 and 3.)

As the shaft R is given a rotary motion in the direction shown by the arrow the spur-pinion Q, by means of the toothed wheel P, causes the sleeve O to rotate, carrying with it the annular trough T and the scrapers U and Z, which are thus enabled to perform their office of removing the surplus filtering material from the filtering device. It will be seen that by continually feeding the filtering material into the upper part of the feed-cylinder A it goes downward by force of gravity and by the action of the screw or worm L until it reaches the chamber I', where it is held by the perforated base-plate K and baffle-ring H.

The liquid to be filtered is poured into the trough T, which has a rotary motion, as already indicated. This liquid passes through the outlets $t'$ into the basins X X, through the perforations $t$ thereof onto the filtering material in the chamber I', and passes through the same and through the perforations or meshes in the base-plate and sides, as indicated by arrows, into the bottom chamber I, from which it passes by the orifice J, as already mentioned.

As the filtering material is continually supplied to the chamber I', and is therefore continually renewed, it is removed by the action of the arms W and the rotating scrapers U and Z, already referred to. This filtering material—if it be, for instance, of sawdust—may be cleaned, dried, and used over again.

If desired, a vacuum may be created in the lower chamber I to facilitate the passage of the liquid through the filtering material.

Instead of my filtering device being put to the use already described it might, for instance, be used for the purpose of cleaning granular materials which may have become covered or caked with soluble impurities. By feeding the material into the feed-cylinder and allowing water from the circular trough and basins X to percolate through it the impurities may be removed from the grains, which would be scooped out and discharged from the machine in a cleansed state by means of the scrapers U and Z.

What I claim as my invention is—

1. In a filtering device, a filtering-chamber provided with a perforated bottom, a feed-cylinder located over said chamber and provided with means for continually feeding material to said filtering-chamber, an inlet arranged to provide material to be filtered on the filtering material in said chamber, means for removing the surplus filtering material from the top of said filtering-chamber, whereby the filtering material is fed from the feed-cylinder into the filtering-chamber, the surplus removed from the top of the said chamber and the material to be filtered passes through said filtering-chamber and through the perforations in its bottom, substantially as described.

2. In a filtering device, the combination with the feed-cylinder A; of the suitably-perforated chamber I'; the rotatable and suitably-perforated trough T, and scraper U, operating in the chamber I', substantially as specified.

3. In a filtering device, the combination with the feed-cylinder A; of the suitably-perforated chamber I'; the rotatable trough T, provided with outlet t'; the perforated basin X, attached to the trough T; and the rotatable scraper U, for removing the filtering material, substantially as specified.

4. In a filtering device, the combination with the feed-cylinder A; of the perforated base-plate K, and perforated sides K', suitably supported; the rotatable trough T, provided with perforated outlets t'; the perforated basins X, X, attached to the trough T; and the rotatable scrapers U, U, for removing the filtering material, substantially as specified.

5. In a filtering device, the combination with the feed-cylinder A; of the perforated base-plate K, and perforated sides K', suitably supported; the baffle-ring H', inside the perforated sides K'; the rotatable trough T, provided with perforated outlets t'; the perforated basins X X, attached to the trough T; and the rotatable scrapers U, U, for removing the filtering material onto the ledge formed by the flange Y, and the auxiliary scrapers Z, Z, for removing the filtering material from the ledge through the hole Y', substantially as specified.

6. In a filtering device, the combination with the feed-cylinder A; of the rotatable main shaft C, suitably journaled; the worm L; one or more rotatable arms W; the perforated base-plate K, and perforated sides K', suitably supported; the rotatable trough T, provided with suitable outlets; one or more basins X, attached to the trough T; and one or more rotatable scrapers U, for removing the filtering material, substantially as specified.

7. In a filtering device, the combination with the feed-cylinder A; of the rotatable main shaft C, suitably journaled; the worm L; one or more arms W; the perforated base-plate K, and perforated sides K', suitably supported; the rotatable trough T, provided with suitable outlets; one or more basins X, attached to the trough T; one or more rotatable scrapers U; and one or more auxiliary scrapers Z, for removing the filtering material from the ledge formed by the flange Y, through the hole Y', substantially as specified.

8. In a filtering device, the combination with the feed-cylinder A, of one or more rotatable arms W; the chamber I' provided with perforated sides K', suitably supported; and the baffle-ring H', substantially as specified.

9. In a filtering device, the combination with the feed-cylinder A; of the shaft R; the bearing-box S; toothed pinion Q, and toothed wheel P, meshing therewith; the sleeve-ring O, movable in the guideway N, and the trough T, attached to the sleeve-ring O, substantially as specified.

10. In a filtering device, the combination with the feed-cylinder A; of the shaft R; the bearing-box S; toothed pinion Q, and toothed wheel P, meshing therewith; sleeve-ring O; guideway N, for the sleeve-ring O; rotatable trough T, with suitable outlet; the perforated basin X; and the scraper U, operating in the upper chamber I', substantially as specified.

11. In a filtering device, the combination with the feed-cylinder A; of the shaft R; bearing-box S; the toothed pinion Q, and toothed wheel P, meshing therewith; sleeve-ring O; guideway N, for the sleeve-ring O; rotatable trough T, with suitable outlet; one or more perforated basins X, suitably attached to the rotatable trough; one or more scrapers U, and one or more scrapers Z, for removing the filtering material from the ledge formed by the flange Y, through the hole Y', substantially as specified.

12. In a filtering device, the combination with the feed-cylinder A; of the rotatable main shaft C, suitably journaled; the worm L, suitably attached to the main shaft and rotated thereby; the socket-block D, suitably supported in operative position for the main shaft; the perforated base-plate K, and perforated sides K', forming with the main frame the open upper chamber I'; the baffle-ring H', and the bottom chamber I, with outlet-orifice J, substantially as specified.

13. In a filtering device, the combination with the feed-cylinder A; of the rotatable main shaft C, with pivot C'; the spiders B, D', for holding the shaft in operative position; the worm L, suitably attached to the main shaft and rotated thereby; the socket-block D; and legs E, for holding the socket-block D, in operative position; the base-ring F; the braces H, connecting the ring F, to the main frame; perforated base-plate K, and perforated sides K', forming with the main frame the open upper chamber I'; the baffle-ring H'; and the bottom chamber I, with outlet-orifice J, substantially as specified.

14. In a filtering device, the combination of a filtering-chamber having a perforated bottom and a suitable exit, a feed-cylinder located above and arranged to feed filtering material on said perforated bottom whereby the weight of the material in said cylinder is on said perforated bottom, and an inlet for the material to be filtered located above the filtering material in said filtering-chamber, substantially as described.

15. In a filtering device, the combination of a filtering-chamber having a perforated bottom and a suitable exit, a feed-cylinder located above and arranged to feed filtering material on said perforated bottom whereby the weight of the material in said cylinder is on said perforated bottom, an inlet for the material to be filtered located above the filtering material in said filtering-chamber, and a screw in said feed-cylinder arranged to force said filtering material in said filtering-chamber, substantially as described.

16. In a filtering device, the combination with the feed-cylinder A; of the suitably-perforated chamber I'; one or more rotatable scrapers U, operating in the chamber I'; and one or more rotatable arms W, substantially as specified.

17. In a filtering device, the combination with the feed-cylinder A; of the perforated chamber I', suitably supported; one or more rotatable scrapers U; and one or more auxiliary scrapers Z, for removing the filtering material from the ledge Y, substantially as specified.

18. In a filtering device, the combination with the feed-cylinder A; of the rotatable main shaft C, suitably journaled; one or more rotatable arms W; the chamber I'; the guideway N, and sleeve-ring O; the annular trough T, and basins X, substantially as specified.

19. In a filtering device, the combination with the feed-cylinder A; of the rotatable main shaft C, suitably journaled; one or more rotatable arms W; the chamber I'; guideway N, and sleeve-ring O; the toothed wheel P, meshing with the toothed pinion Q; the bracket S, and the shaft R, journaled therein; and one or more rotatable scrapers U, substantially as specified.

Goderich, April 5, 1897.

HENRY J. MURNEY.

In presence of—
I. SANDOW,
A. MCDONALD.